US009373175B2

(12) United States Patent
Jung et al.

(10) Patent No.: US 9,373,175 B2
(45) Date of Patent: Jun. 21, 2016

(54) APPARATUS FOR ESTIMATING OF VEHICLE MOVEMENT USING STEREO MATCHING

(71) Applicants: Soon Ki Jung, Daegu (KR); Kwang Hee Won, Daegu (KR)

(72) Inventors: Soon Ki Jung, Daegu (KR); Kwang Hee Won, Daegu (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 109 days.

(21) Appl. No.: 14/087,145

(22) Filed: Nov. 22, 2013

(65) Prior Publication Data
US 2014/0241587 A1 Aug. 28, 2014

(30) Foreign Application Priority Data

Feb. 26, 2013 (KR) .................... 10-2013-0020556

(51) Int. Cl.
*G06K 9/00* (2006.01)
*G06T 7/20* (2006.01)
*G06T 7/00* (2006.01)

(52) U.S. Cl.
CPC .......... *G06T 7/2086* (2013.01); *G06K 9/00208* (2013.01); *G06K 9/00805* (2013.01); *G06T 7/0022* (2013.01); *G06T 2207/10021* (2013.01); *G06T 2207/30252* (2013.01)

(58) Field of Classification Search
None
See application file for complete search history.

(56) References Cited

U.S. PATENT DOCUMENTS

| 8,744,169 | B2* | 6/2014 | Othmezouri | G06T 7/2086 348/42 |
| 8,831,290 | B2* | 9/2014 | Ramalingam et al. | 382/107 |
| 8,983,121 | B2* | 3/2015 | Lim | G06K 9/00771 382/103 |
| 9,251,587 | B2* | 2/2016 | Friend | G06T 7/0042 |
| 2011/0169923 | A1* | 7/2011 | Dellaert et al. | 348/47 |
| 2011/0316980 | A1* | 12/2011 | Dubbelman et al. | 348/47 |

FOREIGN PATENT DOCUMENTS

JP 2005217883 A 8/2005

OTHER PUBLICATIONS

Kitt et al., "Visual odometry based on stereo image sequences with RANSAC-based outlier rejection scheme", 2010 IEEE Intelligent Vehicles Symposium, Jun. 21-24, 2010.*
Kitt et al., "Moving on to dynamic environments: visual odometry using feaeture classification", 2010 IEEE/RSJ International Conference on Intelligent Robots and Systems, Oct. 18-22, 2010.*
Simond et al., "Vehicle trajectory from an uncalibrated stereo-rig with super-homography", 2006 IEEE/RSJ International Conference on Intelligent Robots and Systems, Oct. 9-15, 2006.*
Weydert et al., "Model-based ego-motion and vehicle parameter estimation using visual odometry", 2012 16th Mediterranean Electrotechnical Conference, Mar. 25-28, 2012.*
Office Action issued in counterpart Korean patent Application No. 10-2013-0020556, dated Mar. 31, 2014.

(Continued)

*Primary Examiner* — Soo Park
(74) *Attorney, Agent, or Firm* — Porzio, Bromberg & Newman, P.C.

(57) ABSTRACT

An apparatus for estimating movement of a vehicle using stereo image matching is provided, which divides the stereo image information into ground, background and object labels and measures information about rotation and movement of the vehicle using the label and background labels.

10 Claims, 5 Drawing Sheets

(56) References Cited

OTHER PUBLICATIONS

Won et al. "Ground Plane Stereo Matching." 2011 Korea Computer Congress (KCC), Journal vol. 38, No. 1(C).

Won, et al., "Billboard sweep stereo for obstacle detection in road scenes." Published Nov. 22, 2012.

K.H. Won et al. "Billboard Sweep Stereo for Obstacle Detection in Road Scenes." Electronics Letters, 48(24), 1528-30 (Nov. 22, 2012).

* cited by examiner

APPARATUS FOR ESTIMATING OF VEHICLE MOVEMENT USING STEREO MATCHING

CROSS-REFERENCE TO RELATED APPLICATIONS

This application claims priority from Korean Patent Application No. 10-2013-0020556, filed on Feb. 26, 2013 in the Korean Intellectual Property Office, the disclosure of which is incorporated herein by reference in its entirety.

BACKGROUND

1. Field of the Invention

Apparatuses consistent with what is disclosed herein relate to estimating movement of a vehicle using stereo image matching, and more particularly, to an apparatus for estimating movement of a vehicle using stereo matching by dividing stereo image information into ground, background and object labels, and measuring rotational and movement information of the vehicle using the ground label and the background label.

2. Description of the Related Art

'Smart car' is now one of the important keywords that are considered in the industries including not only automobile industry but also IT industry. This is due to need for safe driving, by way of analyzing scene on the road to provide additional information to a driver and inform a certain event at appropriate and accurate timing.

A camera or a range sensor is installed on an automobile to detect an approaching obstacle or to widen visual field of the driver. Among such sensors, a stereo vision sensor is a representative passive range sensor. The sensor is particularly advantageous because it can produce 2.5 dimensional range data and images at the same time. The resultant range data or disparity map can be used as input information for operations such as detecting obstacles or planning route of travel.

Figure 1:
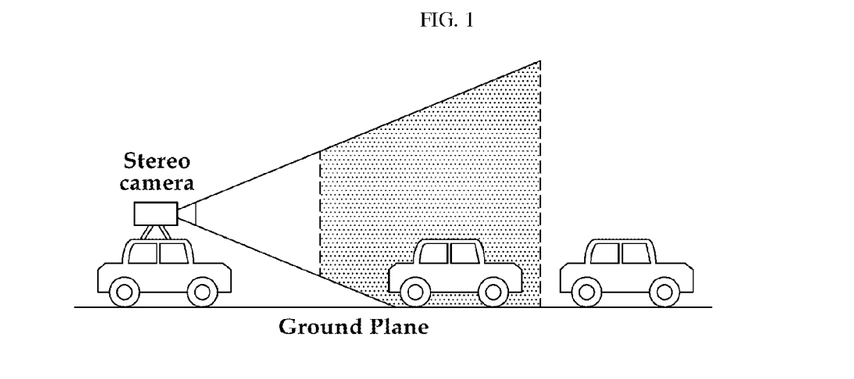
FIG. 1 illustrates a related art stereo matching method based on image plane of a stereo camera.

The currently-available stereo matching algorithm is based on the presumption that zero-disparity plane is in parallel to one of the image planes. However, such presumption cannot be effective particularly when acquiring disparity with respect to plane that is not so parallel with the image plane. Referring to FIG. 1, the related art stereo matching algorithm based on distant reference plane suffers shortcoming that it is only able to perform disparity matching with respect to object within a narrow distance range and that it does not operate with respect to object after disparity.

Further, in order to measure movement of a moving vehicle, it is conventionally necessary to utilize the location information such as GPS or utilize sensing equipment equipped in the vehicle such as steering angle sensor.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

According to an embodiment, a technical objective is to provide an apparatus for estimating movement information of a vehicle by distinguishing acquired image information into three labels, which are, ground, object and background labels, and utilizing the label information.

In one embodiment, an apparatus for estimating a movement of a vehicle, using stereo matching is provided, which may include an imaging unit configured to acquire stereo image using two or more cameras, a label divider configured to divide the stereo image information acquired via the imaging unit into ground, background and object labels by stereo matching based on a series of homographic information, and a movement measurer configured to measure rotational information and movement information of the vehicle using the ground labels of N frame and N+1 frame acquired via the label divider and the background label of the N frame and N+1 frame (where, N is natural number).

The label divider may include a matching cost calculator configured to calculate matching cost among stereo image information based on a series of homographic information including a plurality of ground homographs, object homographs and background homographs, an aggregator configured to aggregate a total cost using the matching cost. a homograph extractor configured to extract homographic information having minimum total cost, and a label identifier configured to identify ground, background and object labels using the extracted homographic information.

The ground homographs may include homographic information about a plane with a predetermined inclination angle with respect to a horizontal plane with respect to the imaging unit, the object homographs may include homographic information regarding a plane which is parallel to an image plane of the imaging unit and which is within a predetermined threshold distance from the imaging unit, and the background homographs may include homographic information regarding a plane which is parallel to the image plane of the imaging unit and which is remoter than the predetermined threshold distance from the imaging unit.

When the extracted homographic information is ground homograph, the label identifier may identify the ground label having a predetermined inclination with respect to a reference plane of the imaging unit, using inclination information of the ground homographic information.

When the extracted homographic information is object homograph, the label identifier may identify the object label which is parallel to the image plane of the imaging unit and which is within the predetermined threshold distance from the imaging unit, using distance information of the object homographic information.

When the extracted homographic information is background homograph, the label identifier identifies the background label which is parallel to the image plane of the imaging unit and which is remoter than the predetermined threshold distance from the imaging unit, using distance information of the background homographic information.

The movement measurer may include a background symmetry unit configured to acquire corresponding points with respect to the background label of the N frame and (N+1) frame, a plane acquisition unit configured to acquire plane information which comprises the corresponding points and a focal point of the imaging unit and which is perpendicular with respect to the ground label of the respective frames, with respect to the N frame and (N+1) frame, and a rotation measurer configured to measure rotational information of the vehicle using angle information between the two planes as acquired at the plane acquisition unit (where, N is natural number).

The rotation measurer may measure information about direction and angle of rotation of the vehicle, using relative position information between the plane information of the N frame and plane information of the (N+1) frame as acquired at the plane acquisition unit, and angle information between the two planes (where, N is natural number).

The movement measurer may include a ground matching unit configured to acquire corresponding points between the ground label of the N frame and the ground label of the (N+1) frame inversely reflecting the measured rotational information (where, N is natural number), and a movement measurer configured to measure the movement information of the vehicle using 3 dimensional (3D) information of the corresponding points as acquired at the ground matching unit.

The movement measurer may use 3D information about a plurality of corresponding points located in a predetermined area to measure information about movement of the vehicle using average distance information between the respective corresponding points.

According to various embodiments, an apparatus for estimating movement of a vehicle using stereo image matching can divide the stereo image information into ground, background and object labels and measure information about rotation and movement of the vehicle using the label and background labels.

BRIEF DESCRIPTION OF THE DRAWINGS

The above and/or other aspects of the present inventive concept will be more apparent by describing certain exemplary embodiments of the present inventive concept with reference to the accompanying drawings, in which.

DETAILED DESCRIPTION OF EXEMPLARY EMBODIMENTS

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

The expression such as 'first' or 'second' may be used to describe a variety of constituent elements, but should not be construed as limiting the referred elements. The expressions are used only for the purpose of distinguishing one element from the other.

Throughout the description, the expressions are used to describe specific embodiments, and not to be construed as limiting the invention. A singular form, unless specifically indicated otherwise in its context, encompasses a plural expression. The expression such as 'comprise' or 'include' as used herein is so used as to designate existence of certain characteristics, figures, steps, operations, elements, components, or a combination thereof as indicated in the description, and not to be construed as limiting existence of one or more characteristics, figures, steps, operations, elements, components, or a combination thereof which are other than those indicated herein.

Hereinbelow, certain embodiments will be explained in detail with reference to accompanying drawings.

Figure 2:
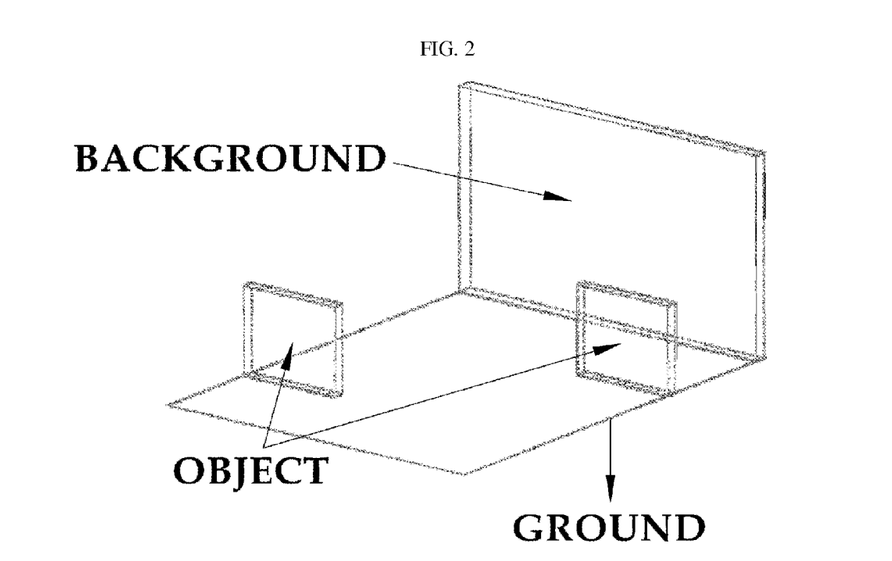
FIG. 2 illustrates stereo image divided into ground, object and background labels, according to an embodiment.

FIG. 2 illustrates stereo image divided into ground, object and background labels, according to an embodiment.

Referring to FIG. 2, an apparatus for estimating movement of a vehicle using stereo matching according to an embodiment separates acquired stereo image information into ground label, object label and background label. For example, a movement measuring apparatus applied on a vehicle running on a predetermined road may divide the image information about ground of the road of the stereo image information into ground label, divide the other vehicles running in front of the vehicle into object label, and divide the images of surrounding buildings or distant sky into background label.

Although FIG. 2 depicts a certain example where the stereo image information is composed of one ground label, one background label and a plurality of object labels, this may vary depending on the stereo image information as acquired. For example, a plurality of ground labels, or a plurality of background labels may be implemented. Detailed technical constitution will be explained below with reference to FIG. 3.

Figure 3:
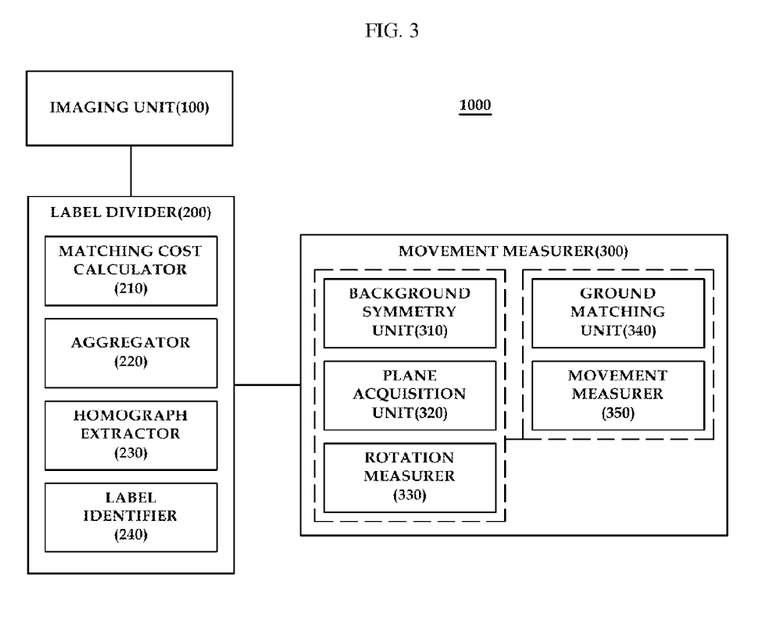
FIG. 3 illustrates a movement measuring apparatus of a vehicle using stereo matching according to an embodiment.

FIG. 3 illustrates a movement measuring apparatus of a vehicle using stereo matching according to an embodiment.

Referring to FIG. 3, an apparatus 1000 for measuring movement of a vehicle using stereo matching according to one implementable embodiment may include an imaging unit 100 configured to acquire stereo image using two or more cameras; a label divider 200 configured to divide stereo image information acquired via the imaging unit 100 into ground, background and object labels by stereo matching based on a series of homographic information, and a movement measurer 300 configured to measure rotational information and movement information of the vehicle using the ground labels of N frame and N+1 frame acquired via the label divider 200 and the background label of the N frame and N+1 frame (where, N is natural number).

First, the imaging unit 100 acquires stereo image using two or more cameras. The imaging unit 100 may also employ image information acquisition apparatus such as a charge-coupled device (CCD) camera or a CMOS camera. For example, the imaging unit 100 may be implemented in the form of a stereo camera system having 6 mm C-mount lens and 24 cm base line.

The imaging unit 100 may be provided at a predetermined portion of the vehicle to acquire surrounding image information of the vehicle. In a preferred embodiment, the imaging unit 100 may be installed at a location of headlight of the vehicle, or on an upper portion of the vehicle as illustrated in FIG. 1, to acquire the image information, although not limited thereto. Accordingly, in another embodiment, the imaging unit 100 may be implemented in such a form to easily acquire image information left or right to the vehicle.

The expression 'image plane' as used herein refers to image information that represents the image information acquired at the imaging unit 100 in the plane configuration, and the expression 'horizontal plane' refers to actual plane information that is formed perpendicularly to the image plane and parallel to the imaging unit 100.

The label divider 200 matches the stereo image information acquired at the imaging unit 100 with stereo matching based on a series of homographic information, and divides the same into ground, background and object labels. In one implementable embodiment, the label divider 200 may include a matching cost calculator 210 configured to calculate matching cost among stereo image information based on a series of homographic information including a plurality of ground homographs, object homographs and background homographs, an aggregator 220 configured to aggregate total cost using the matching cost, a homograph extractor 230 configured to extract homographic information having minimum total cost, and a label identifier 240 configured to identify ground, background and object labels using the extracted homographic information.

The disparity image obtained by the stereo matching can generally be obtained by using an imaginary plane parallel to the image plane of the camera as a reference plane (i.e., plane with 0 disparity) of the disparity image. For the two parallel cameras, the plane with 0 disparity is at infinity.

In one embodiment, it is possible to set the actual ground information as the reference plane of the disparity image, using a series of homographic information. In this embodiment, the pixels acquired with respect to actual ground have very small disparity value which is near to 0.

As explained above, ground homographic information may be utilized to convert the actual ground information into reference plane of the disparity image. The actual ground information in the image information may have different inclinations depending on various embodiments. In one embodiment, a series of homographic information including a plurality of ground homographs may be used. For example, the ground homographs may be the homographic information with respect to plane, having a predetermined inclination with respect to the horizontal plane.

Similarly, the object homographic information may be used to extract object information having a predetermined height from the ground. In one embodiment, the object information may be parallel to the image plane of the imaging unit 100, and at a predetermined distance apart from the imaging unit 100. In order to extract the object information, the homographic information with respect to a plane, which is parallel to the image plane of the imaging unit 100 and at a predetermined distance apart from the imaging unit 100, may be utilized as the object homographs. In a preferred embodiment, a plurality of object homographs having different distance information from the imaging unit 100 may be implemented.

Figure 4:
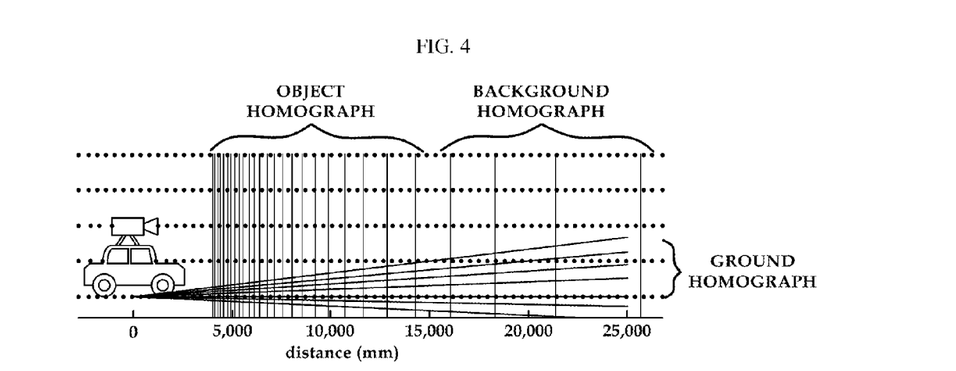
FIG. 4 illustrates an example of a series of homographic information.

The series of homographic information may include a variety of ground homographs, object homographs and background homograph as illustrated in FIG. 4. The plurality of ground homographic information may include inclination information with respect to the horizontal plane, and the plurality of object and background homographic information may include distance information from the imaging unit 100.

The matching cost calculator 210 may calculate matching cost among the stereo image information using a series of homographic information including a plurality of ground homographs, object homographs and background homographs. The matching cost calculator 210 may calculate intensity value of the pixel at a location where a specific homographic information is applied, with respect to a specific pixel of the left-side or right-side images.

To be more specific, it is possible to calculate the matching cost of a specific pixel using the following mathematical expression:

$$C(p,i)=|I_L(p)-I_R(H_i(p))|$$ [Mathematical Expression 1]

where, $(C(\cdot)$: matching cost, p: pixel, $I_{L(or\ R)}(p)$: intensity value at pixel (p), $H_i(\cdot)$: (i)th homographic information).

Referring to Mathematical Expression 1, symbols 'IL' and 'IR' denote left-side and right-side stereo images. According to Mathematical Expression 1, it is possible to calculate the matching cost using a difference between intensity values of the right-side image reflecting homographic information and intensity values of the left-side images, although not limited thereto. Accordingly, in another embodiment, it is possible to calculate the matching cost using a difference between the intensity values of the left-side images reflecting homographic information and intensity values of the right-side images.

Figure 5:
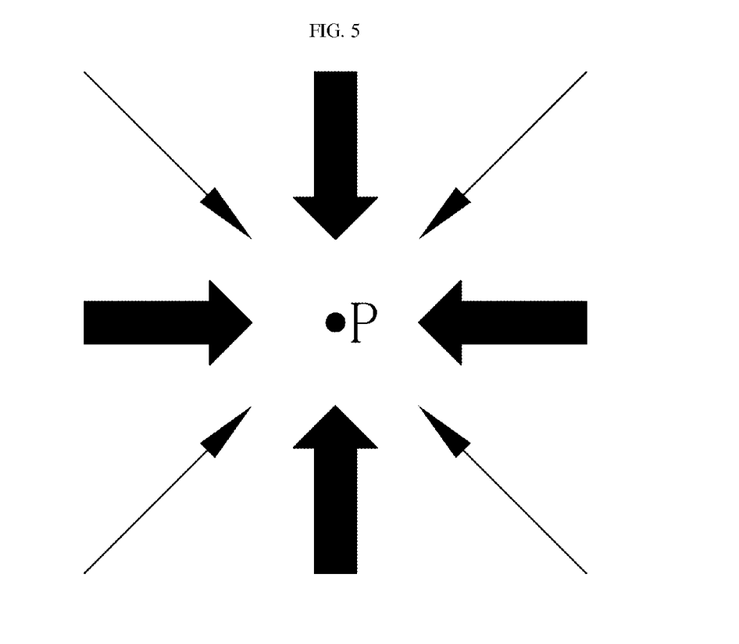
FIG. 5 illustrates a method for calculating total expense according to an embodiment.

The aggregator 220 calculates total cost using the matching cost. In one embodiment, the aggregator 220 may calculate the total cost by aggregating the matching costs along a plurality of directions (r). For example, the plurality of eight directions may include eight directions with reference to a specific pixel. In one embodiment, all the eight directions may be implemented as the plurality of directions (as illustrated in FIG. 5), or only four selected directions (in thick arrows in FIG. 5) may be applied. The aggregator 220 may calculate the matching cost along several directions of the image to reduce the possible error explained above, which is similar to the semi-global matching (SGM). The total (Lr) of the matching costs in the respective directions (r) may be determined according to Mathematical Expression 2.

$$L_r(p,i)=C(p,i)+\min(L_r(p_p,i),L_r(p_p,i\pm 1)+p$$ [Mathematical Expression 2]

(where, Lr(p,i): total matching costs of pixel (p) and (i)th homograph, pp: previous pixel with respect to direction of aggregating, k: number other than i, i±1, p1: additional cost for small disparity (or inclination) change, p2: additional cost for large disparity (or inclination) change).

The values 'p1' and 'p2' may be adaptively determined, depending on a difference of pixel values between p and pp. Using the additional cost, it is possible to compensate for possible matching error in external environment which may be generated due to various causes such as blurring, occlusion, or asynchronous acquisition due to other exposure or movement.

The homograph extractor 230 extracts homographic information having minimum total cost. That is, the homograph extractor 230 extracts homographic information that can minimize total cost, using a series of homographic information. The series of homographic information may include a plurality of ground homographs, object homographs and background homographs.

In one embodiment, the series of homographic information may be constructed in a predetermined order. For example, referring to FIG. 5, the ground homograph may be arranged in front of the series of homographic information, and the object and background homographs may be arranged after the ground homographs. The homograph extractor 230 may identify the ground or object homographs using order information of the homographic information that minimizes the total cost.

The label identifier 240 identifies the ground, background and object labels using the homographic information extracted at the homograph extractor 230.

In one embodiment, when the extracted homographic information is the ground homographs, the label identifier 240 may identify the ground label with a predetermined inclination with respect to the reference plane of the imaging unit 100, using the inclination information of the ground homographic information.

In another embodiment, when the extracted homographic information is the object homographs, the label identifier 240 may identify the object label which is parallel to the image plane of the imaging unit 100 and which is within a predetermined threshold distance from the imaging unit 100, using the distance information of the object homographic information.

In another embodiment, when the extracted homographic information is the background homographs, the label identifier 240 may identify the background label, which is parallel to the image plane of the imaging unit 100 and which is at a predetermined threshold distance from the imaging unit 100, using the distance information of the background homographic information.

As explained above, it is possible to identify the stereo image into the ground label which represents the ground information, the object label which represents object information within a predetermined threshold distance from the imaging unit 100, and the background label which represents the background information which is remoter than the predetermined threshold distance and thus has small disparity between frames.

In one embodiment, the movement measurer 300 may include a background symmetry unit 310 configured to acquire corresponding points with respect to the background label of the N frame and (N+1) frame, a plane acquisition unit 320 configured to acquire plane information which includes the corresponding points and a focal point of the imaging unit 110 and which is perpendicular with respect to the ground label of each frame, with respect to the N frame and (N+1) frame, and a rotation measurer 330 configured to measure rotational information of the vehicle using angle information between the two planes as acquired at the plane acquisition unit 320 (where, N is natural number). The respective components of the movement measurer 300 will be explained in detail below with reference to FIG. 7.

Figure 7:
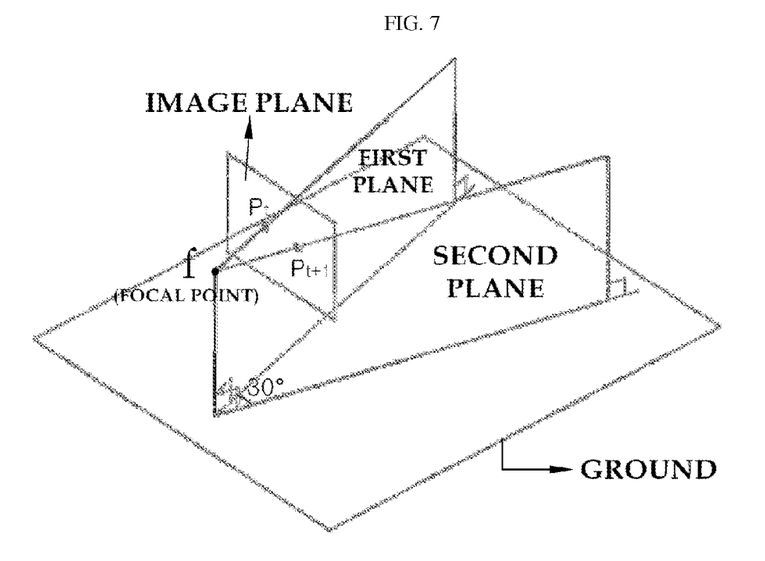
FIG. 7 illustrates a method for measuring rotational movement of a vehicle, according to an embodiment.

FIG. 7 illustrates a method for measuring rotational movement of a vehicle, according to an embodiment.

Figure 6:
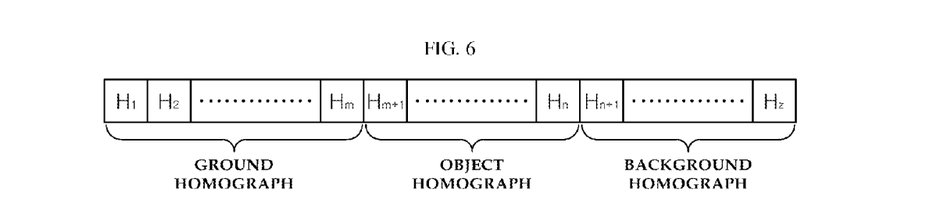
FIG. 6 illustrates a set of a series of homographic information.

The background symmetry unit 310 may acquire pixel information corresponding to the background label of the N frame and (N+1) frame. In order to find the corresponding point, a variety of image processing technologies may be implemented. FIG. 6 particularly illustrates corresponding points (Pt, Pt+1) with respect to the background labels of the N frame and (N+1) frame.

After that, the plane acquisition unit 320 acquires plane information which includes the respective corresponding points and a focal point of the imaging unit 100 and which is perpendicular to the ground label of the respective frames, with respect to the background labels of the N frame and (N+1) frame. That is, it is possible to obtain information about the focal point of the imaging unit 100, using the parameter values of the imaging unit 100.

In one embodiment, the ground labels of the N frame and (N+1) frame are the ground labels that are acquired at a brief time interval, in which each of the ground labels may be extracted using the same ground homographs. For the reasons set forth above, FIG. 7 illustrates an embodiment in which the ground labels of N frame and (N+1) frame are included in the same ground plane, but not limited thereto. Accordingly, the ground labels of the respective frames may be included in different ground planes.

With respect to the background labels of the N frame and (N+1) frame, the plane acquisition unit 320 may acquire plane information which includes the corresponding points and the focal point of the imaging unit 100 and which is perpendicular to the ground labels of the respective frames, with respect to the N frame and (N+1) frame. Referring to FIG. 7, the plane acquisition unit 320 may acquire first and second planes.

The rotation measurer 330 may measure the rotational information of the vehicle, using the angle information between the two planes as acquired by the plane acquisition unit 320. Referring to FIG. 7, because the first and second planes are perpendicular to the ground plane, the angle between the first and second planes may be acquired based on the angle information between intersecting lines of the first and second planes with the ground plane.

In one embodiment, the rotation measurer 330 may measure the information about direction and angle of rotation of the vehicle, using the relative position information between the plane information of the N frame and the plane information of the (N+1) frame acquired by the plane acquisition unit 320, and the angle information between the two planes. To be specific, when (Pt+1) is relatively at a right side than Pt, it is possible to know that the vehicle rotates to the left side, based on the relative position information. This is similar to the principle that when one turns his head to the left, the object that used to be in front is located at the right side now. Contrary to FIG. 7, when (Pt+1) is relatively at a left side than Pt, this indicates that the vehicle has rotated to the right side.

The rotation measurer 330 may measure the accurate rotational movement information of the vehicle using the information about the direction and angle of rotation of the vehicle. Referring to FIG. 7, the fact that the first and second planes are at 30° indicates that the vehicle has rotated 30° to the left.

In one embodiment, the movement measurer 300 may include a ground matching unit 340 configured to acquire corresponding points between the ground label of the N frame and the ground label of the (N+1) frame inversely reflecting the measured rotational information (where, N is natural number), and a movement measurer 350 configured to measure the movement information of the vehicle using 3 dimensional (3D) information of the corresponding points as acquired at the ground matching unit 340.

To be specific, the ground matching unit 340 may acquire corresponding points between the ground label of the N frame and the ground label of the (N+1) frame which inversely reflects the measured rotational information. The ground matching unit 340 reflects the measured rotational information inversely to the ground label of the (N+1) frame so that the corresponding points between the N frame and the (N+1) frame are located on a perpendicular line on the image plane. The rotational information may be inversely reflected by applying inverse matrix of the matrix representing the rotational information.

The movement measurer 350 measures the movement information of the vehicle, using the 3D information of the corresponding points as acquired at the ground matching unit 340. That is, the movement measurer 350 may acquire 3D information about the respective corresponding points between the N frame and the (N+1) frame, and measure the movement information using the 3D distance information between the corresponding points. The 3D distance information may be acquired using the disparity information with stereo matching.

The movement measurer 350 may measure the movement speed of the vehicle, using the measured movement information and time difference between the respective frames.

Further, the movement measurer 350 may measure the movement information of the vehicle using the average distance between the respective corresponding points, using 3D information about a plurality of corresponding points located within a predetermined area. The movement measurer 350 may measure the movement information with higher reliability with the methods mentioned above.

Figure 8A:
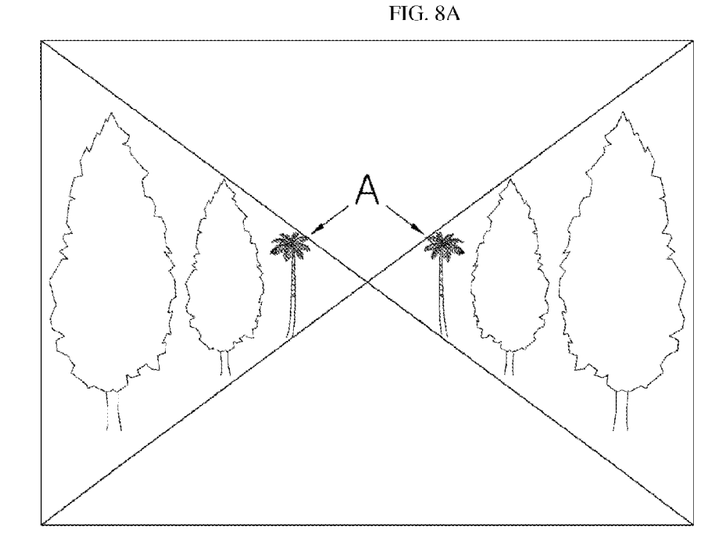
FIGS. 8A and 8B illustrate an example of an image acquired to measure distance of travel of a vehicle, according to an embodiment.
Figure 8B:
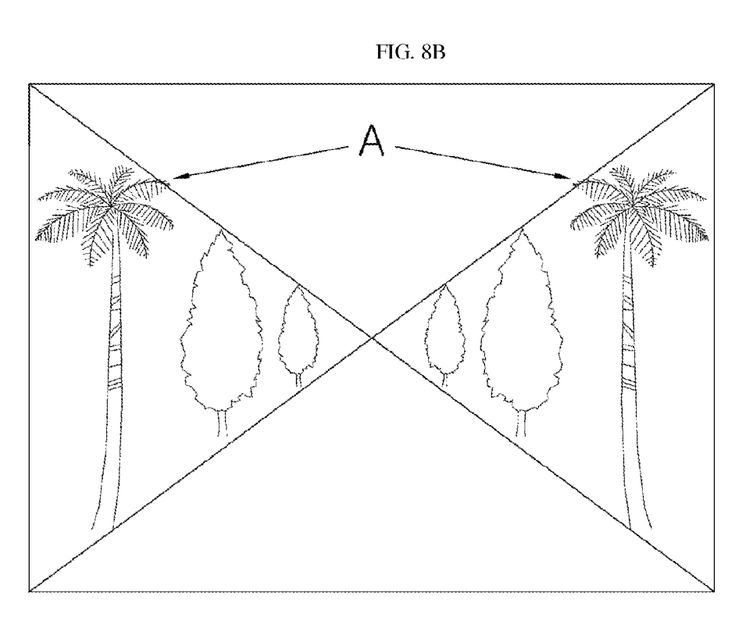

FIGS. 8A and 8B illustrate an example of an image acquired to measure distance of travel of a vehicle, according to an embodiment.

The apparatus for estimating movement of vehicle using stereo matching according to an embodiment may utilize N frame and (N+1) frame as illustrated in FIGS. 8A and 8B to measure a distance of travel of the vehicle.

First, the ground matching unit 340 may inversely apply the rotational information to the (N+1) frame image information to re-construct the N frame and (N+1) frame information into image information that faces the same direction. With the above-mentioned method, it is possible to acquire image information with respect to the same direction, as illustrated in FIGS. 8A and 8B.

After that, the movement measurer 350 measures the movement information of the vehicle by comparing the two image information. For example, the movement measurer 350 may acquire corresponding points (A) with respect to the two image information and then measure a distance of travel of the vehicle, using 3D distance information between the corresponding points.

The foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

What is claimed is:

1. An apparatus for estimating a movement of a vehicle, using stereo matching, the apparatus comprising:
    an imaging unit configured to acquire stereo image using two or more cameras;
    a label divider configured to divide the stereo image information acquired via the imaging unit into ground, background and object labels by stereo matching based on a series of homographic information; and
    a movement measurer configured to measure rotational information and movement information of the vehicle using the ground labels of N frame and N+1 frame acquired via the label divider and the background label of the N frame and N+1 frame (where, N is natural number).

2. The apparatus of claim 1, wherein the label divider comprises:
    a matching cost calculator configured to calculate matching cost among stereo image information based on a series of homographic information including a plurality of ground homographs, object homographs and background homographs;
    an aggregator configured to aggregate a total cost using the matching cost;
    a homograph extractor configured to extract homographic information having minimum total cost; and
    a label identifier configured to identify ground, background and object labels using the extracted homographic information.

3. The apparatus of claim 2, wherein the ground homographs comprise homographic information about a plane with a predetermined inclination angle with respect to a horizontal plane with respect to the imaging unit, the object homographs comprise homographic information regarding a plane which is parallel to an image plane of the imaging unit and which is within a predetermined threshold distance from the imaging unit, and the background homographs comprise homographic information regarding a plane which is parallel to the image plane of the imaging unit and which is remoter than the predetermined threshold distance from the imaging unit.

4. The apparatus of claim 3, wherein, when the extracted homographic information is ground homograph, the label identifier identifies the ground label having a predetermined inclination with respect to a reference plane of the imaging unit, using inclination information of the ground homographic information.

5. The apparatus of claim 3, wherein, when the extracted homographic information is object homograph, the label identifier identifies the object label which is parallel to the image plane of the imaging unit and which is within the predetermined threshold distance from the imaging unit, using distance information of the object homographic information.

6. The apparatus of claim 3, wherein, when the extracted homographic information is background homograph, the label identifier identifies the background label which is parallel to the image plane of the imaging unit and which is remoter than the predetermined threshold distance from the imaging unit, using distance information of the background homographic information.

7. The apparatus of claim 1, wherein the movement measurer comprises:
    a ground matching unit configured to acquire corresponding points between the ground label of the N frame and the ground label of the (N+1) frame inversely reflecting the measured rotational information (where, N is natural number); and
    a movement measurer configured to measure the movement information of the vehicle using 3 dimensional (3D) information of the corresponding points as acquired at the ground matching unit.

8. The apparatus of claim 7, wherein the movement measurer uses 3D information about a plurality of corresponding points located in a predetermined area to measure information about movement of the vehicle using average distance information between the respective corresponding points.

9. An apparatus for estimating a movement of a vehicle, using stereo matching, the apparatus comprising:
    an imaging unit configured to acquire stereo image using two or more cameras;
    a label divider configured to divide the stereo image information acquired via the imaging unit into ground, background and object labels by stereo matching based on a series of homographic information; and
    a movement measurer configured to measure rotational information and movement information of the vehicle using the ground labels of N frame and N+1 frame acquired via the label divider and the background label of the N frame and N+1 frame (where, N is natural number), wherein the movement measurer comprises:
    a background symmetry unit configured to acquire corresponding points with respect to the background label of the N frame and (N+1) frame;
    a plane acquisition unit configured to acquire plane information which comprises the corresponding points and a focal point of the imaging unit and which is perpendicular with respect to the ground label of the respective frames, with respect to the N frame and (N+1) frame; and a rotation measurer configured to measure rotational information of the vehicle using angle information between the two planes as acquired at the plane acquisition unit (where, N is natural number).

10. The apparatus of claim 9, wherein the rotation measurer measures information about direction and angle of rotation of the vehicle, using relative position information between the plane information of the N frame and plane information of the (N+1) frame as acquired at the plane acquisition unit, and angle information between the two planes (where, N is natural number).

* * * * *